(12) United States Patent
Hauber et al.

(10) Patent No.: US 10,800,113 B2
(45) Date of Patent: Oct. 13, 2020

(54) BONDING FOR ADDITIVELY MANUFACTURED THERMOPLASTIC COMPOSITE STRUCTURES

(71) Applicant: ADC Acquisition Company, Schenectady, NY (US)

(72) Inventors: David E. Hauber, Troy, NY (US); Zachary A. August, Santa Clara, CA (US)

(*) Notice: Subject to any disclaimer, the term of this patent is extended or adjusted under 35 U.S.C. 154(b) by 331 days.

(21) Appl. No.: 15/798,923

(22) Filed: Oct. 31, 2017

(65) Prior Publication Data

US 2018/0154591 A1    Jun. 7, 2018

Related U.S. Application Data

(60) Provisional application No. 62/429,822, filed on Dec. 4, 2016.

(51) Int. Cl.
| | |
|---|---|
| *B32B 41/00* | (2006.01) |
| *B29C 70/38* | (2006.01) |
| *B33Y 50/00* | (2015.01) |
| *B33Y 30/00* | (2015.01) |
| *B33Y 10/00* | (2015.01) |

(52) U.S. Cl.
CPC ............ *B29C 70/382* (2013.01); *B33Y 50/00* (2014.12); *B33Y 10/00* (2014.12); *B33Y 30/00* (2014.12)

(58) Field of Classification Search
CPC ....... B29C 70/382; B33Y 50/00; B33Y 10/00; B33Y 30/00
USPC .......................... 156/64, 350, 351, 378, 379
See application file for complete search history.

(56) References Cited

U.S. PATENT DOCUMENTS

2013/0000838 A1*  1/2013  Kimball ................. B29C 70/00
                                                                    156/285
2014/0328963 A1*  11/2014  Mark ...................... B29C 70/20
                                                                    425/143

\* cited by examiner

*Primary Examiner* — Michael N Orlando
*Assistant Examiner* — Joshel Rivera
(74) *Attorney, Agent, or Firm* — Maxine L. Barasch; Keohane & D'Alessandro, PLLC

(57) ABSTRACT

Disclosed embodiments provide automated fiber placement techniques for fabrication of parts made from composite materials. Tape plies are wound around a mandrel while a polymer is dispensed on a tape ply shortly before compaction. A bead monitoring system monitors the size and placement of the bead on the tape ply and feeds back information to various process control systems to maintain an optimal bead size.

16 Claims, 7 Drawing Sheets

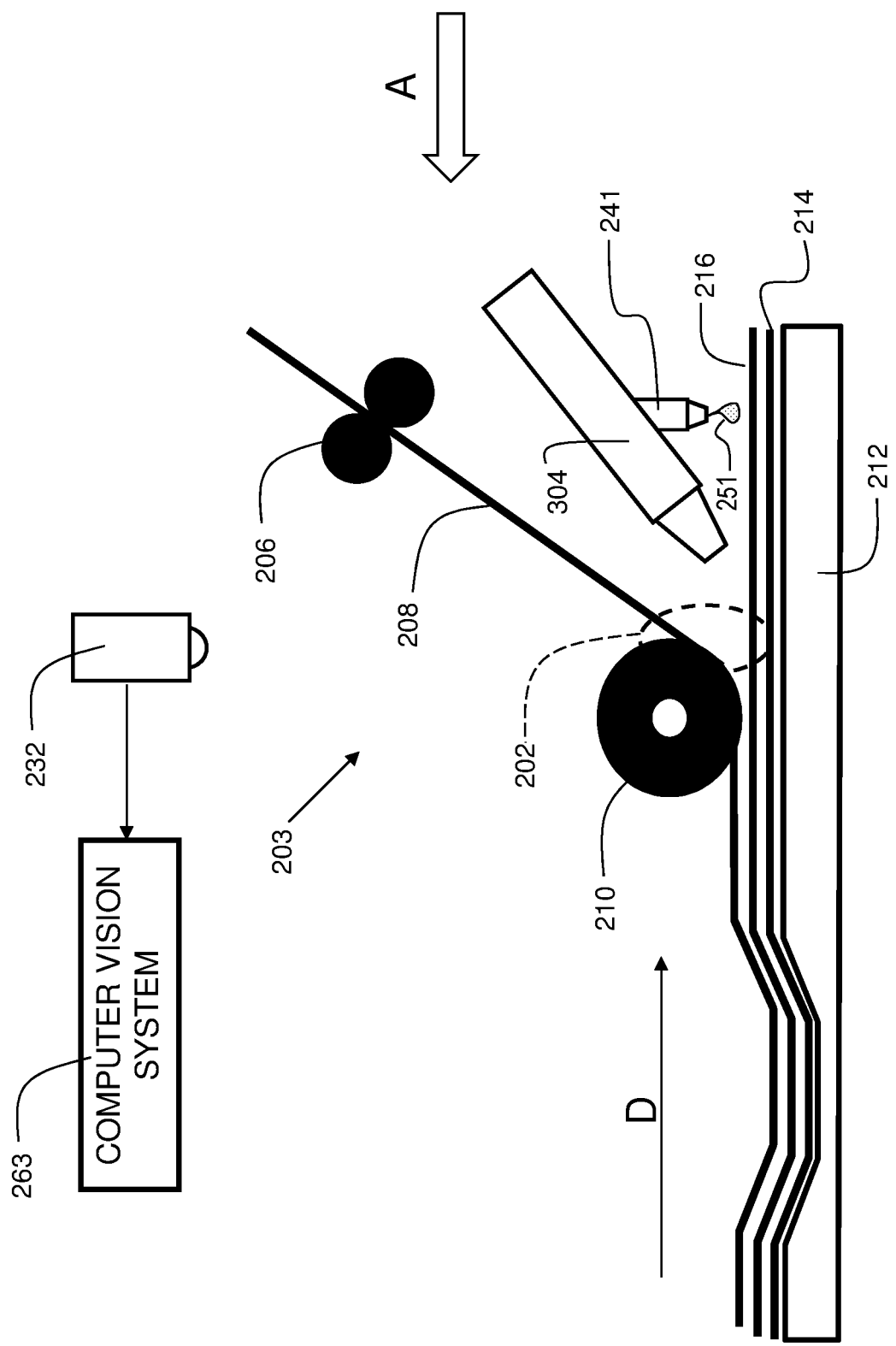

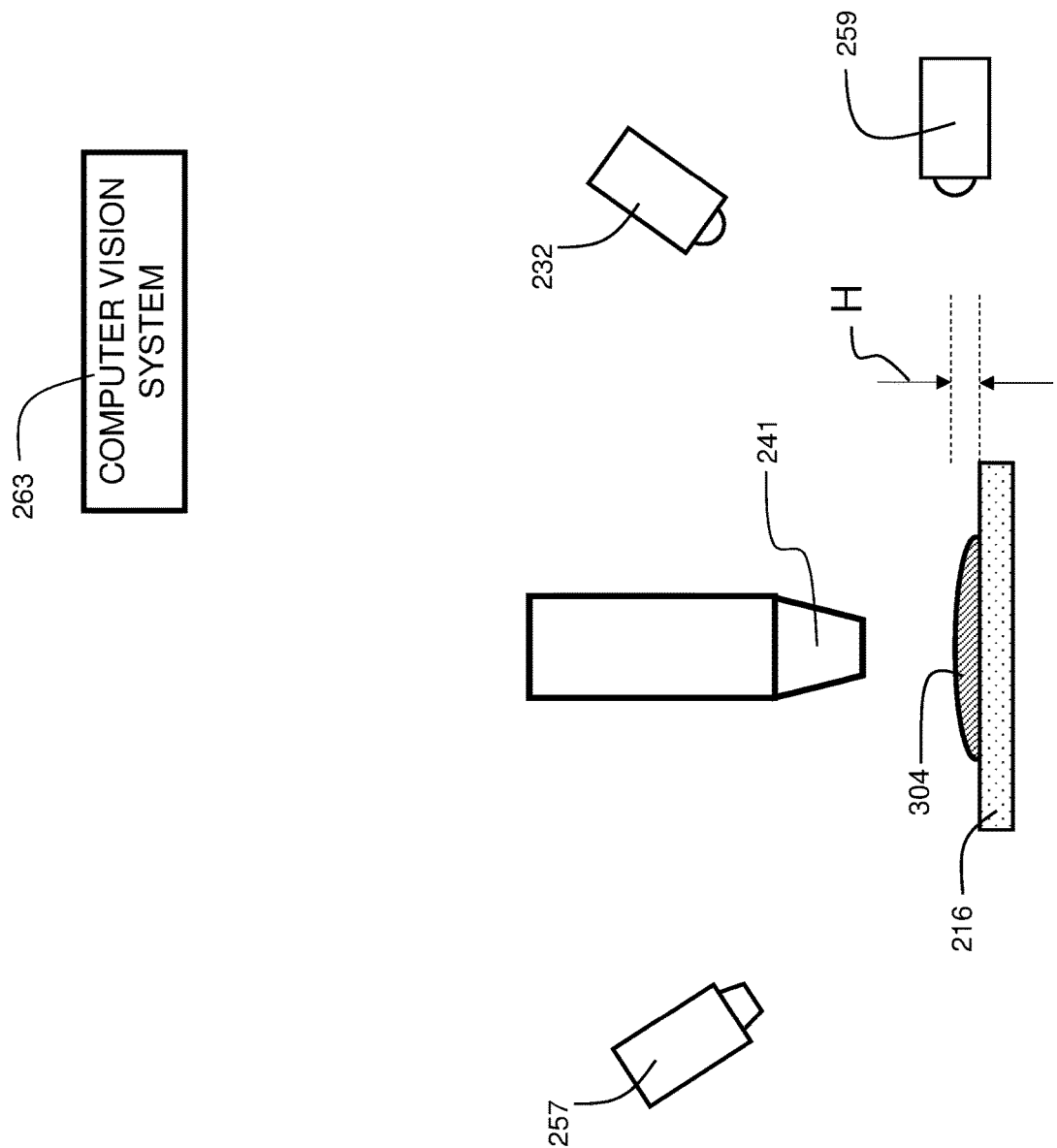

BONDING FOR ADDITIVELY MANUFACTURED THERMOPLASTIC COMPOSITE STRUCTURES

CROSS REFERENCE TO RELATED APPLICATIONS

This application claims priority to U.S. Patent Application Ser. No. 62/429,822, filed on Dec. 4, 2016, the entire contents of which are incorporated herein by reference.

FIELD OF THE INVENTION

The present invention relates generally to composite structures, and more particularly, to bonding for additively manufactured thermoplastic composite structures.

BACKGROUND

Composite materials are being used for a variety of applications that previously relied on metal. High-strength and lightweight, composite materials are being used in parts such as aircraft wings, automobile rims, and other critical components. While composite materials provide improved performance in terms of strength to weight ratios, the time and cost of manufacture continues to be an issue. Therefore, it is desirable to have improvements in the manufacture of composite structures.

SUMMARY

To improve commercial feasibility, it is desirable to increase automation in fabrication of composite parts. In order to take advantage of the directional strength characteristics of composites, the fibers are placed layer by layer in orientations and patterns that optimize their strength and stiffness for a given application. Example applications include, without limitation, aircraft wings, fuselages, and propeller blades. Disclosed embodiments enable designers to create a model, "print" it, and have a functional part in minutes using automated fiber placement (AFP). AFP is an additive manufacturing process for composites. There are now many manufacturers of AFP equipment for thermoset composites in production worldwide. The benefits of AFP include material and labor savings and improved quality.

In current processes with thermoset composites, there is still a curing step that requires a manual bagging operation and an expensive autoclave cycle. The autoclave is a bottleneck in the manufacturing process. Disclosed embodiments provide a process that eliminates the expensive, energy inefficient, time consuming, bottleneck of bagging and curing of thermoset composites while still providing a high-quality, high-strength composite part by using thermoplastic composites. Furthermore, for applications such as aircrafts, composite parts can provide reduced non-routine maintenance, and improved resistance to cracking and corrosion as compared with conventional materials such as aluminum. The reduced risk of corrosion and fatigue associated with composites combined with available composite repair techniques can reduce overall maintenance costs and maximize airline revenue by reducing downtime of aircraft due to maintenance.

Thermoplastic composites have many advantages over thermosets including:
Melt processable (no cure chemistry, no long soak times, cohesive bonding)
Extreme toughness/damage tolerance
Superior solvent and chemical resistance
No toxicity/hazardous chemical issues
No refrigeration or out-time considerations
Recyclable
Great FST (Fire, Smoke, Toxicity) stability
Hydrolytic stability—low water absorption
Stable glass transition temperature (Tg)—even under Hot/Wet conditions
Good fatigue resistance
Low coefficient of friction
High abrasion resistance Another major advantage of thermoplastics over thermosets is cycle time reduction. As industry enters the age of mass customization, it is desirable to have improvements in automated fiber placement with thermoplastic composites.

A fundamental shortcoming of current AFP processes is that they have not achieved aerospace quality laminates without post processes. The basic problem is that economically viable process throughputs do not allow enough time for the polymer to fully bond (reptation or interfusion) or voids to migrate out of the interface between plies. Disclosed embodiments address this by providing techniques to improve the polymer bond strength in the Heat Affected Zone (HAZ) of the AFP apparatus. Shear thinning and squeeze flow of the polymer in the HAZ are important factors in producing a high quality, low void bond. This requires a consistent flow of polymer in the HAZ. This is challenging because additional polymer reduces the overall strength of the structure. The challenge therefore is to maximize bond strength while minimizing additional polymer and voids by providing optimal polymer flow in the HAZ.

Disclosed embodiments achieve this by using a polymer monitoring and dispensing system within the AFP apparatus. In in-situ AFP of thermoplastic composites, a preimpregnated, fiber reinforced thermoplastic tape or filament (prepreg) is automatically dispensed in a controlled manner onto the surface of a tool or mold. The tape is heated above its melt temperature and then compacted by a roller onto the previous plies. The polymer portion of the tape cools and a bond is affected. The approach of this disclosure is to add additional polymer to the bond zone ahead of the roller nip point to create a molten polymer bead. This improves wetting, polymer chain migration, reduced voids, and heat transfer, ultimately leading to better bonding and higher quality structures.

Disclosed embodiments provide techniques to feed a polymer filament or powder into the HAZ between the incoming tape and the previous ply. The process heat source can include hot gas, laser, microwaves, or other suitable heat source. In other embodiments, molten polymer is added to the surface of the incoming tape upstream of the nip point. It can then cool and be carried into the nip region by the tape itself. This simplifies delivery of the additional polymer.

In embodiments, the dispensed polymer can include, but is not limited to, PEKK (polyetherketoneketone), PEK (polyetherketone), PAEK (Polyarlyetherkeone), PPS (Polyphenylene Sulfide), PI (Polyimide), TPI (Thermoplastic Polyimide), PEI (Polyetherimide), PP (Polypropylene), PE (Polyethylene), PBT (Polybutylene Terephthalate), FEP (Fluorinated Ethylene Propylene), PFA (Perfluoroalkoxy), PVDF (Polyvinylidene floride), PTFE (Polytetrafluoroethylene), ETFE (Poly(Ethylene Tetrafluoroethylene)), PET (Polyethylene Terephthalate), TPU (Thermoplastic Polyurethane), PA (Polyimide), PAI (Polyamide-Imide), PBT (Polybutylene Terephthalate), or any combination thereof.

Disclosed embodiments can enable production of critical components such as aircraft wings and the like without the need for the costly and time-consuming autoclave processes.

In embodiments, there is provided an apparatus comprising: a tape dispensing system; a heating system; a polymer dispensing system; a bead monitoring system; a compaction system; a processor; a memory coupled to the processor, wherein the memory contains instructions, that when executed by the processor, perform the steps of: dispensing a first ply over a mandrel; dispensing a tape of thermoplastic composite prepreg onto the first ply while simultaneously dispensing a polymer bead between the first ply and the tape of thermoplastic composite prepreg such that the polymer bead spreads to a width substantially equal to the width of the tape of thermoplastic composite prepreg and compacting the thermoplastic composite tape onto the first ply. This process is repeated for subsequent tape s to build up subsequent plies.

In other embodiments, there is provided a computer-implemented method for performing automated fiber placement, comprising: perform the steps of: dispensing a first ply over a mandrel; dispensing a tape of thermoplastic composite prepreg onto the first ply while simultaneously dispensing a polymer bead between the first ply and the tape of thermoplastic composite prepreg such that the polymer bead spreads to a width substantially equal to the width of the tape of thermoplastic composite prepreg and compacting the thermoplastic composite tape onto the first ply. This process is repeated for subsequent tapes to build up subsequent plies.

In other embodiments, there is provided a computer program product embodied in a computer-readable medium, comprising instructions, that when executed by a processor to perform the steps of: dispensing a first ply over a mandrel; dispensing a tape of thermoplastic composite prepreg onto the first ply while simultaneously dispensing a polymer bead between the first ply and the tape of thermoplastic composite prepreg such that the polymer bead spreads to a width substantially equal to the width of the tape of thermoplastic composite prepreg and compacting the thermoplastic composite tape onto the first ply. This process is repeated for subsequent tapes to build up subsequent plies.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering may represent like elements.

FIG. 2C is a diagram of an apparatus utilizing a molten polymer dispensing system in accordance with embodiments of the present invention.

FIG. 2D is a diagram of an alternative embodiment of an apparatus utilizing a molten polymer dispensing system.

DETAILED DESCRIPTION

Disclosed embodiments provide automated fiber placement techniques for fabrication of parts made from composite materials. Tape plies are wound around a mandrel while a polymer is dispensed on a tape ply shortly before compaction. A bead monitoring system monitors the size and placement of the bead on the tape ply and feeds back information to various process control systems to maintain an optimal bead size.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the term "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Figure 1:
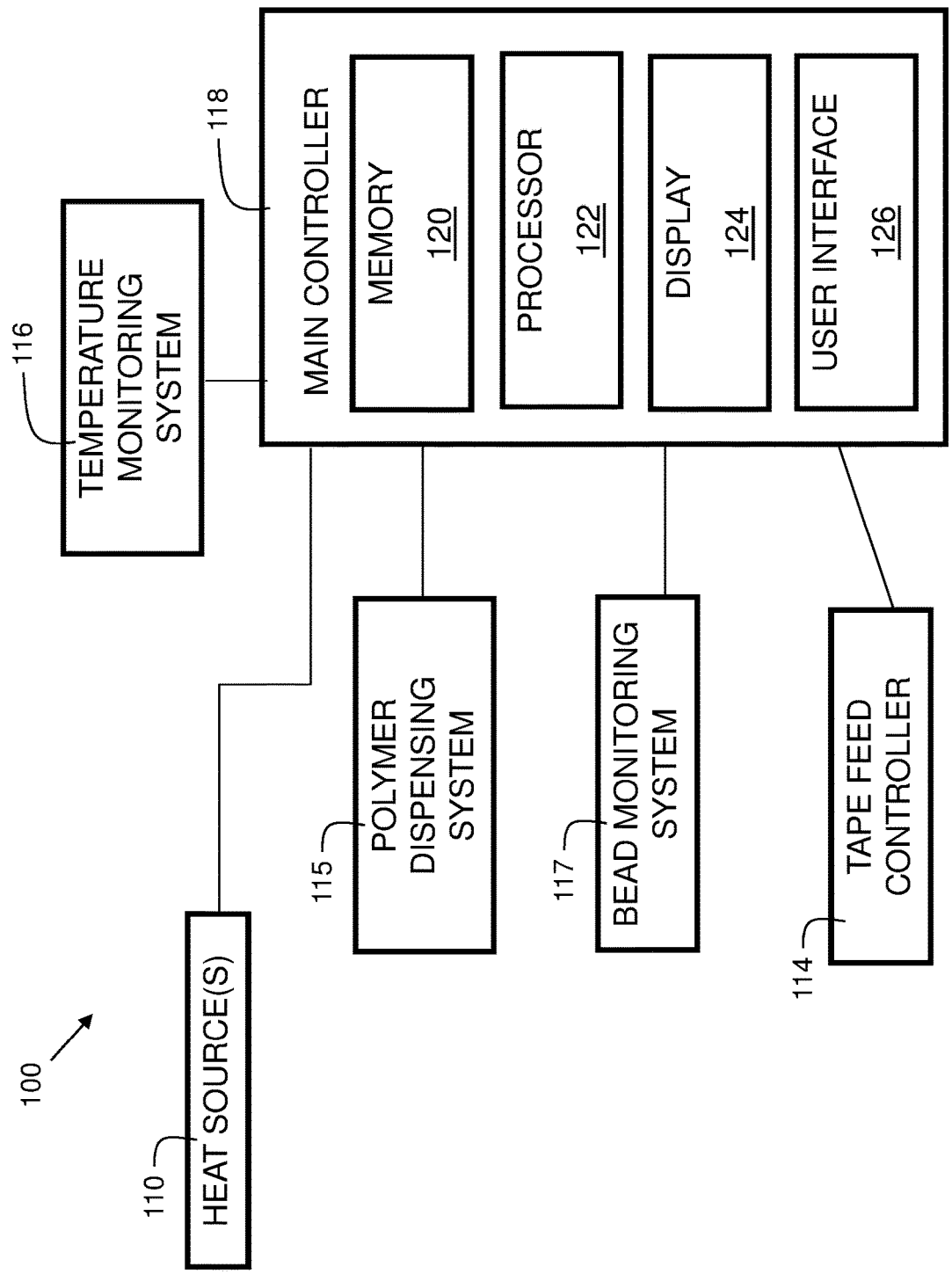
FIG. 1 is a block diagram of an apparatus in accordance with embodiments of the present invention.

FIG. 1 shows a system block diagram in accordance with an embodiment of the present invention. System 100 comprises a main controller 118. Main controller 118 may be a computer comprising memory 120, and a processor 122 which is configured to read and write memory 120. The memory 120 may be non-transitory memory, such as flash, ROM, non-volatile static ram, or the like. The memory 120 contains instructions that, when executed by processor 122, control the various subsystems to operate system 100. Main controller 118 may also comprise a display 124 and a user interface 126 for interacting with the system 100. The user interface 126 may comprise a keyboard, touch screen, mouse, or the like.

The main controller 118 may receive temperature information from temperature monitoring system 116. Temperature monitoring system 116 may comprise a non-contact device for measuring the temperature of the material near the exit point or heat affected zone (HAZ). The temperature monitoring system 116 may comprise a thermal imaging system or other suitable means for monitoring the temperature of the material near the HAZ. The main controller may in turn adjust the energy output of one or more of the heat sources 110 to maintain a desired temperature range. The material dispensing speed, which determines the amount of time the material remains within the HAZ, may also be monitored by the main controller 118 by communicating with tape feed controller 114. If the dispensing speed increases, the energy output may also be increased to compensate for the reduced time the material spends in the HAZ. If the speed increases beyond the point where the temperature can be maintained at the desired temperature, the main controller 118 can communicate with the tape feed controller 114 to reduce the speed.

The memory 120 of the main controller 118 may be configured to store a plurality of material profiles, or access them from an outside database. Each material profile may contain the various parameters for optimal heating, such as a desired energy density profile for that material. For example, some materials may perform better when heated gradually, whereas for other materials, a specific exit temperature range may be more important. The profile for each material may contain the preferred energy output settings for each heat source, and may also contain a preferred material dispensing speed. When a user is using a particular material, he may select the corresponding material profile, which then establishes the desired settings of the heat sources 110 and optionally the dispensing speed by communicating with tape feed controller 114.

The main controller 118 is further in communication with a polymer dispensing system 115. In embodiments, the polymer dispensing system 115 may include a filament polymer dispensing system, powdered polymer dispensing system, and/or a molten polymer dispensing system. When the polymer is dispensed into, or in close proximity to, the heat affected zone (HAZ) created by heat sources 110, it forms a bead. The bead size is an important parameter for fabrication of aircraft-grade composite components. A bead monitoring system 117 substantially continuously or periodically monitors the size, volume, and/or location of dispensed polymer material on a ply of fiber tape. In some embodiments, the dispensed polymer material forms a molten or liquid bead. In other embodiments, such as with powder dispensing, the powder becomes a bead after compaction with the roller. However, for the purposes of this disclosure, the term "bead" and "dispensed polymer material" may be used interchangeably. Thus, the bead monitoring system 117 may monitor the width of dispensed polymer material, regardless of if the dispensed polymer material is in liquid form, solid form, power form, or other suitable form.

The bead size is selected such that, upon compaction, it extends substantially to the width of the ply of tape, but not beyond it. The word "substantially" herein is interpreted to mean "to a significant extent", but that minor variations may be present. The bead monitoring system 117 feeds back information to the main controller 118. In response, the main controller 118 can adjust the rate at which the polymer is dispensed from the polymer dispensing system 115. Additionally, or instead, the main controller 118 can adjust the temperature of the HAZ by controlling the heat source(s) 110. Additionally, or instead, the main controller 118 can adjust the tape speed by controlling the tape feed controller 114. Additionally, or instead, the main controller 118 can adjust the compaction pressure by controlling the tape feed controller 114. Thus, multiple process parameters can be adjusted to maintain a consistent bead size.

Figure 2A:
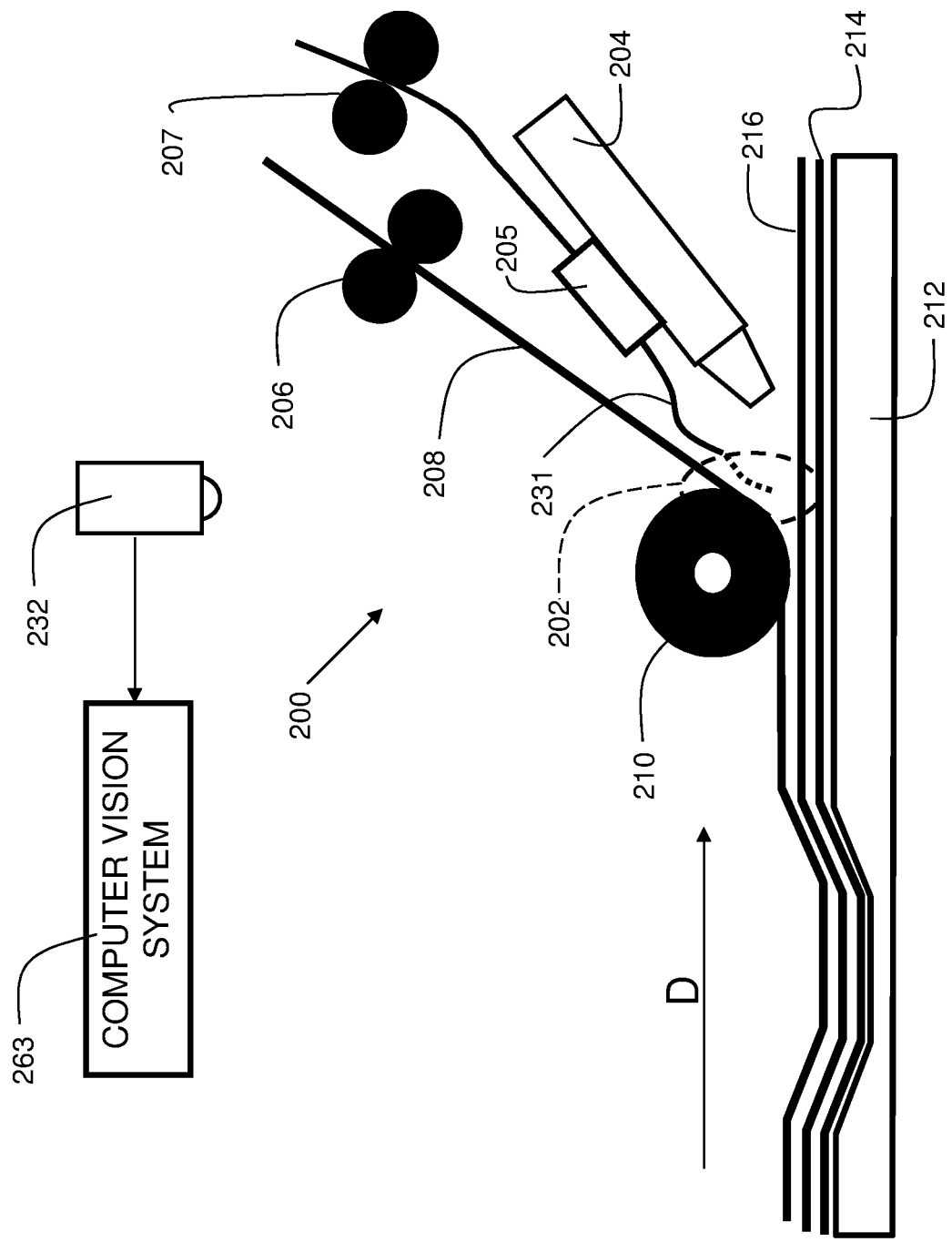
FIG. 2A is a diagram of an apparatus utilizing a filament polymer dispensing system in accordance with embodiments of the present invention.

FIG. 2A is a diagram of an apparatus 200 utilizing a filament polymer dispensing system. Fiber tapes are placed over a tool (mandrel) 212 to form a desired component shape. As shown in FIG. 2A, tape 214 and tape 216 have been previously applied. Tape 208 is currently being applied. A heat source 204 applies heat to the currently applied tape 208 as it is dispensed from tape feed 206, and also applies heat to the previously applied tape 216. The heat source 204 may be a laser, hot gas torch, or any other suitable device. The area where heat is applied is referred to as a Heat Affected Zone (HAZ) 202. A filament polymer dispensing system 205 dispenses a polymer filament 231. The polymer filament 231 is dispensed from filament supply 207 and melts as it enters the HAZ 202. The polymer filament 231 forms a bead on the previously applied tape. The HAZ raises the currently applied tape 208, polymer, and the previously applied tape 216 to a temperature suitable to affect a bond between the layers. Currently applied tape 208 is then compacted to (pressed against) previously applied tape 216 with the polymer 231 disposed between them, by compaction roller 210, causing a strong bond to form between tape ply 208 and tape ply 216. In some embodiments, the filament comprises a PEEK filament.

The larger the HAZ, the more time it takes to cool and the more residual stresses are induced. The tape shrinks as it cools due to its Coefficient of Thermal Expansion (CTE) at varying rates depending on factors, non-limiting examples of which include the type of fiber, matrix, and the direction (e.g., fiber direction or cross-fiber direction) in which shrinkage is measured. The currently applied tape 208, heat source 204, and associated tape supply mechanism travel in direction D to apply the tape. In some embodiments, this motion may be repeated as necessary or desirable to build up a composite shape.

One way to achieve a small HAZ 202 is to use a high intensity energy source such as a laser. If the laser energy is of a wavelength that is absorbed by the polymer (such as $CO_2$ lasers at 10.6 µm), then the high intensities that are needed for high process rates tend to vaporize or otherwise damage the polymer on the surface resulting in poor bond quality. Therefore, with the non-uniform fiber distribution and/or surfaces of the prior art approaches, uneven heating and poor bond quality can result. If the laser energy is of a wavelength to which the polymer is transparent (such as, for example, diode lasers or fiber lasers at 1060 nm) then an absorbing material can be used to further enhance the HAZ.

Image acquisition device (e.g. camera) 232 is disposed to monitor the bead produced by filament 231. Image acquisition device 232 is coupled to a computer vision system 263 to perform automated bead size and/or location measurements. The computer vision system 263 is at least one computing device, having a processor and memory. The memory may store instructions, that when executed by the computing device, perform the bead size and/or location measurements. In embodiments, image acquisition device 232 may be a video camera, still camera, or other digital image acquisition device. The image acquisition device may be a visible light camera, infrared light camera, X-ray camera, or other suitable imaging device. While one camera is shown in FIG. 2A, in embodiments, multiple cameras may be used to monitor the bead size from a variety of angles and vantage points (as depicted in FIG. 2D).

Figure 2B:
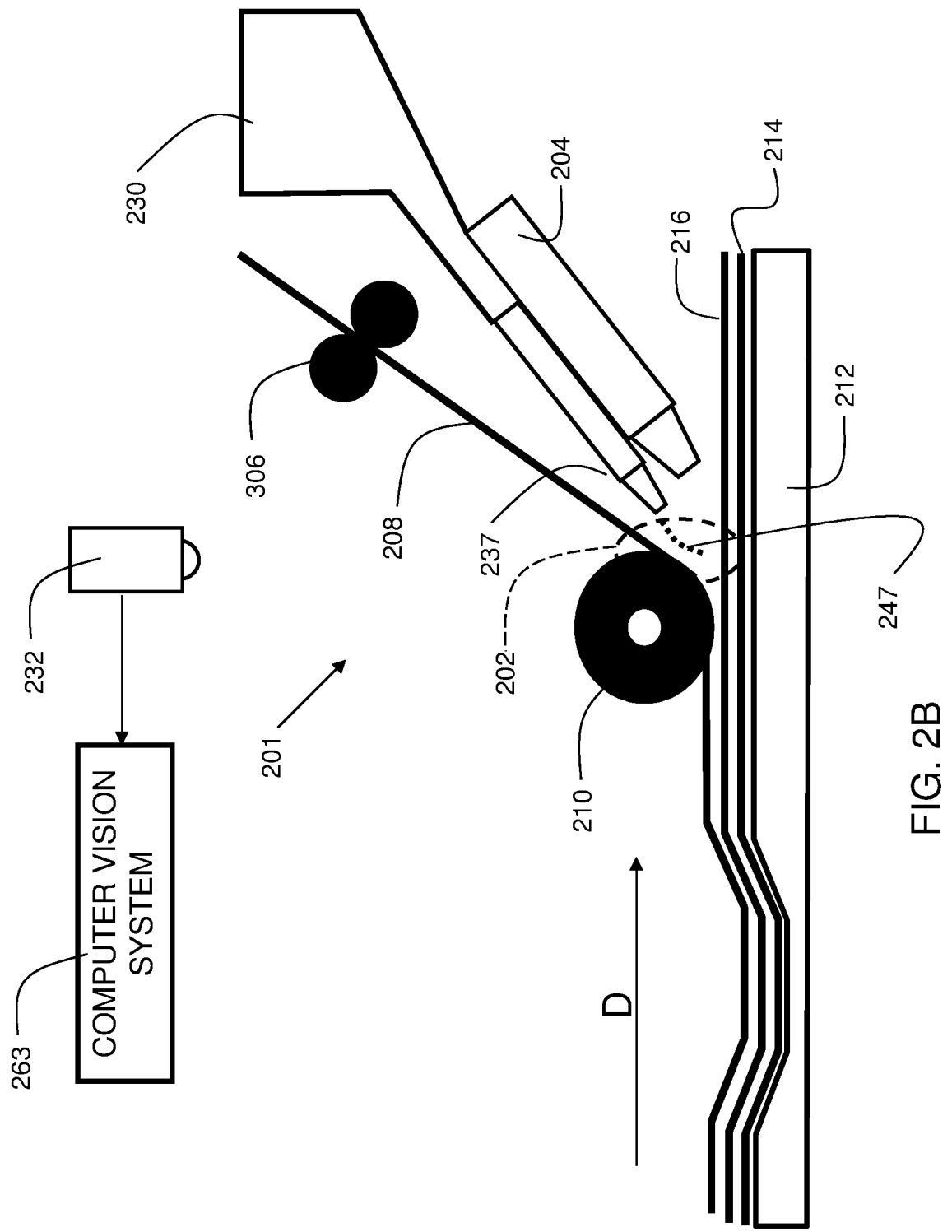
FIG. 2B is a diagram of an apparatus utilizing a powdered polymer dispensing system in accordance with embodiments of the present invention.

FIG. 2B is a diagram of an apparatus 201 utilizing a powdered polymer dispensing system. Apparatus 201 is similar to apparatus 200 of FIG. 2A, except that instead of a filament polymer dispensing system, a powdered polymer dispensing system 237 is used to dispense powdered polymer 247. In embodiments, the powdered polymer dispensing system 237 may be a vibratory dispensing system, corkscrew dispensing system, conveyor belt dispensing system, or other suitable powdered polymer dispensing system. A hopper 230 may store a supply of powdered polymer for dispensing. The powdered polymer is dispensed at or near the HAZ 202 such that it quickly becomes liquid and forms a bead on ply 216. In some embodiments, the powdered polymer is comprised of particles having a size ranging from 10 microns to 75 microns.

FIG. 2C is a diagram of an apparatus 203 utilizing a molten polymer dispensing system. Apparatus 203 is similar to apparatus 200 of FIG. 2A, except that instead of a filament polymer dispensing system, molten polymer dispensing system 241 is used to dispense polymer 251. In this embodiment, the polymer 251 may be dispensed at some distance away from the HAZ 202, which simplifies design considerations of the apparatus. In some embodiments, the polymer 251 may be dispensed at a distance from the HAZ 202 ranging from five centimeters to ten centimeters. This is an example, and not meant to be limiting. Other suitable distances are included within the scope of the invention.

FIG. 2D is a diagram of an alternative embodiment of an apparatus utilizing a molten polymer dispensing system. FIG. 2D shows a view from the vantage point of arrow A of FIG. 2C. In this view, multiple image acquisition devices are depicted. A first image acquisition device 232 may be oriented to acquire a top-down view of the polymer bead 304. A second image acquisition device 259 may be oriented horizontally with respect to polymer bead 304, such that it can measure a height H of polymer bead 304. The height, bead width, and overall bead volume can be important parameters in a thermoplastic composite application. Optionally, a non-contact temperature probe 257 may be oriented to monitor a temperature of the polymer bead 304 as it is being applied to a surface of tape ply 216. In embodiments, the non-contact temperature probe includes an infrared (IR) sensor. The information acquired by the probe 257 and the image acquisition devices (cameras) 232 and 259 may be sent to the computer vision system 263, temperature monitoring system 116, polymer dispensing system 115, bead monitoring system 117, and/or tape feed controller 114.

Figure 3:
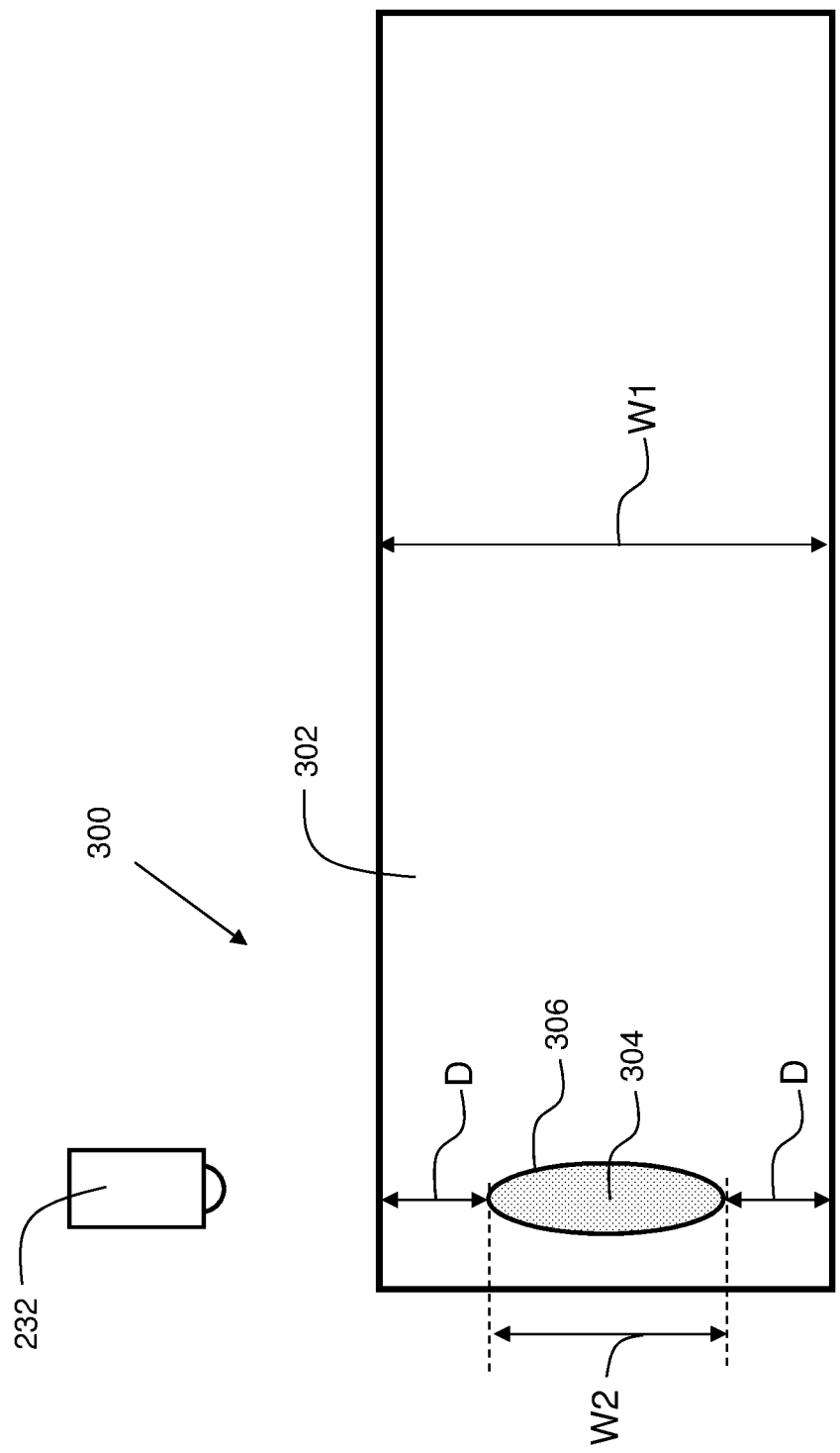
FIG. 3 shows an example polymer bead in accordance with embodiments of the present invention.

FIG. 3 shows an example 300 of a polymer bead in accordance with embodiments of the present invention in a top-down view. A tape ply 302 has a polymer material (bead) 304 dispensed on it. Camera 232 monitors the size of bead 304. In embodiments, camera 232 may be coupled to a computer vision system that performs an edge detection process to identify edge 306 of the bead 304. The system determines a bead width W2, and a margin distance D. The margin distance D is a distance from the edge of the tape ply 302 to the closest point of the bead 304. The tape ply has a width W1 where W1>W2. In some embodiments, a volume of the bead may also be computed, based on W2, and H (FIG. 2D). In some embodiments, the volume is approximated as:

$$H \times W2 \times \pi/2$$

In some embodiments, the computer vision system may perform a gradient analysis to determine the edge boundary. In other embodiments, the computer vision system may utilize a color analysis to identify the location of the polymer bead against the tape ply. In embodiments, the value of each pixel in a gradient matrix represents the value of the intensity gradient in a given pixel location. In embodiments, the gradient size is calculated as the Pythagorean sum of the difference between the intensity of a given pixel and its close neighbors, and a gradient map is computed. The gradient map can be effective for edge detection since the edges of objects and patterns in images are usually characterized by a strong intensity change. Therefore, edges of the polymer bead in acquired images can be found by locating image areas with a large gradient. In some embodiments, an edge image is computed as a binary matrix in which each pixel (cell) can have one of two values: 0 (black) or 1 (white). Pixels with values of 1 correspond to edges in the image. Edges in the image are usually characterized by a sharp change in intensity. Therefore, a simple method for the identification of edges is using all pixels in which the intensity gradient size exceeds some threshold value. In other embodiments, a more sophisticated method such as a Canny edge detector may be used for determining the edge of the polymer bead. Once the bead (material) 304 is compacted (e.g., by compaction roller 210), it covers the width W1 of the dispensed tape. In embodiments, the compacted width of the material 304 is substantially equal to W1, and thus, excess material does not seep out from the plies. This is an important aspect of successful fabrication of composite parts, as it reduces waste by eliminating excess polymer material, while providing maximum contact area of the polymer material, contributing to the strength of composite parts formed using disclosed techniques.

Figure 4:
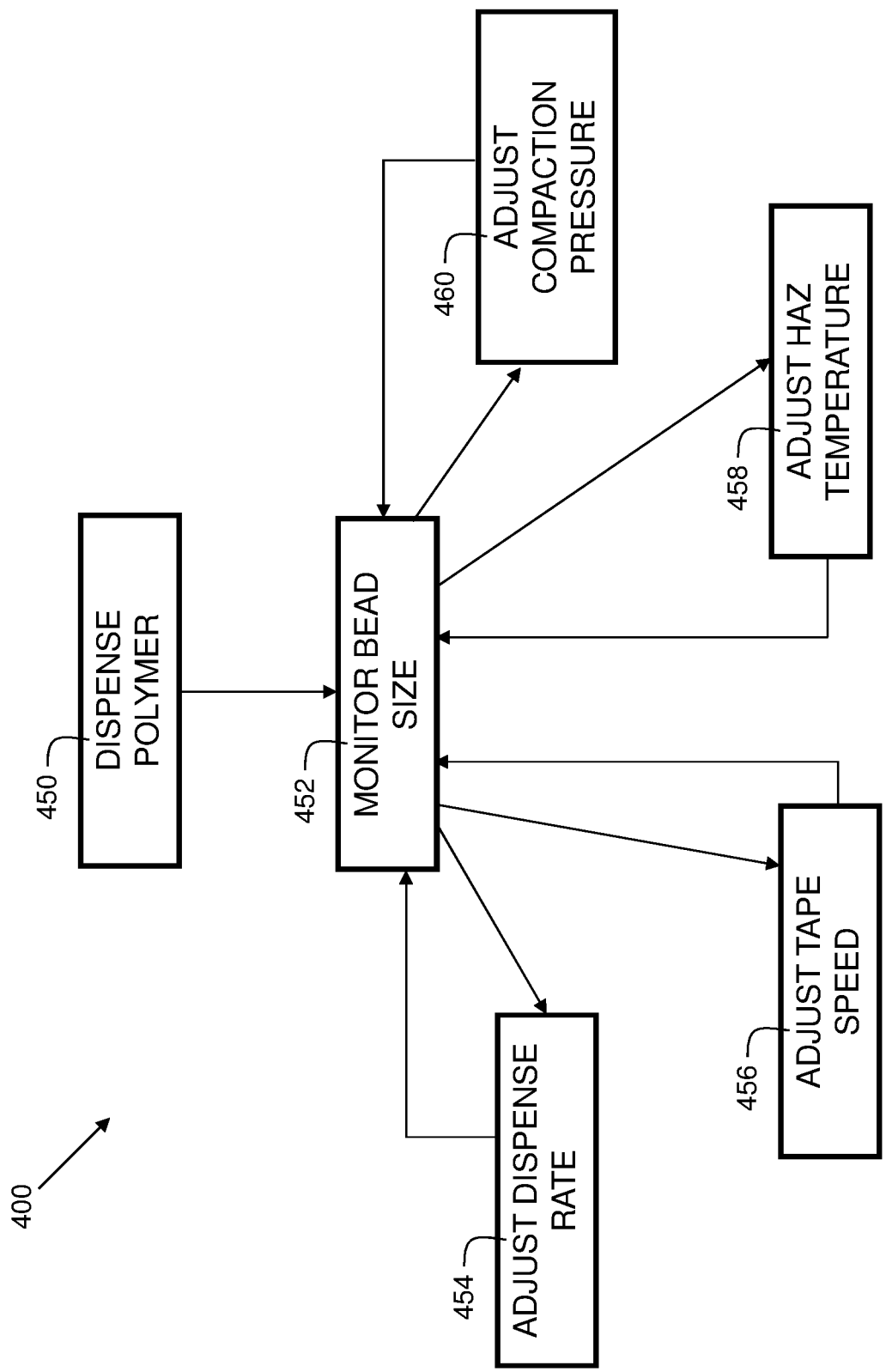
FIG. 4 is a flowchart indicating process steps for embodiments of the present invention.

FIG. 4 is a flowchart 400 indicating process steps for embodiments of the present invention. In process step 450, a polymer is dispensed at or near the HAZ of an automated fiber placement apparatus. At process step 452 the bead size of the polymer is monitored. Then, one or more process parameters may be periodically adjusted to maintain a consistent bead size and/or location. These include adjusting a dispense rate of the polymer at process step 454, adjusting a tape speed at process step 456, adjusting a HAZ temperature at process step 458, and/or adjusting a compaction pressure at process step 460. The process then continues back to process step 452 for continuous monitoring of the bead during placement of tape plies. Thus, embodiments include continuously monitoring the bead width and adjusting a process parameter to maintain a constant bead width. In embodiments, the bead size B is defined as:

$$B = K_1(D) + K_2(P) + K_3(T) + K_4(S)$$

Where: $K_1$, $K_2$, $K_3$, and $K_4$ are constants, and
D is the dispense rate of the polymer;
S is the tape speed;
T is the temperature of the HAZ; and
P is the compaction pressure.

In embodiments, the constants may be tuned empirically for a given application. This formula is an example, and any suitable formula is included within the scope of the invention.

As can now be appreciated, embodiments of the present invention provide a method and apparatus for automated fiber placement techniques for fabrication of parts made from composite materials. Tape plies are wound around a mandrel while a polymer is dispensed on a tape ply shortly before compaction. A bead monitoring system monitors the size and placement of the bead on the tape ply and feeds back information to various process control systems to maintain an optimal bead size. This allows fabrication of high-performance components such as aircraft wings and propeller blades in a cost-effective and time-efficient manner.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A computer-implemented method for performing automated fiber placement, comprising:
    dispensing a first ply over a mandrel;
    dispensing a tape on the first ply;
    dispensing a polymer material between the first ply and the dispensed tape, wherein the polymer material comprises a powdered polymer bead comprised of particles having a size ranging from 10 microns to 75 microns; and
    compacting the dispensed tape onto the first ply, such that the polymer material width covers the width of the dispensed tape.

2. The method of claim 1, further comprising:
    substantially continuously monitoring the polymer material width; and
    adjusting a process parameter to maintain a constant polymer material width.

3. The method of claim 1, wherein continuously monitoring the polymer material width comprises acquiring multiple images of the bead with a video camera.

4. The method of claim 3, further comprising performing an edge detection process on the multiple images to identify the polymer material width.

5. The method of claim 2, wherein adjusting a process parameter comprises adjusting a polymer dispensing rate.

6. The method of claim 2, wherein adjusting a process parameter comprises adjusting a tape speed.

7. The method of claim 2, wherein adjusting a process parameter comprises adjusting a heat affected zone temperature.

8. The method of claim 2, wherein adjusting a process parameter comprises adjusting a compaction pressure.

9. An apparatus comprising:
    a tape dispensing system;
    a heating system;
    a polymer dispensing system;
    a bead monitoring system;
    a compaction system;
    a processor;
    a memory coupled to the processor, wherein the memory contains instructions, that when executed by the processor, perform the steps of:
        dispensing a first ply over a mandrel;
        dispensing a tape on the first ply;
        dispensing a polymer material between the first ply and the dispensed tape, wherein the polymer material comprises a powdered polymer bead comprised of particles having a size ranging from 10 microns to 75 microns; and
        compacting the dispensed tape onto the first ply, such that the polymer material width covers the width of the dispensed tape.

10. The apparatus of claim 9, wherein the memory further contains instructions, that when executed by the processor, perform the steps of:
    substantially continuously monitoring a polymer material width; and
    adjusting a process parameter to maintain a constant polymer material width.

11. The apparatus of claim 9, wherein the bead monitoring system comprises a computer vision system.

12. The apparatus of claim 9, wherein the polymer dispensing system comprises a filament polymer dispensing system.

13. The apparatus of claim 9, wherein the polymer dispensing system comprises a vibratory dispensing system.

14. The apparatus of claim 9, wherein the polymer dispensing system comprises a molten dispensing system.

15. A computer program product embodied in a computer-readable medium, comprising instructions, that when executed by a processor, perform the steps of:
    dispensing a first ply over a mandrel;
    dispensing a tape on the first ply;
    dispensing a polymer material between the first ply and the dispensed tape, wherein the polymer material comprises a powdered polymer bead comprised of particles having a size ranging from 10 microns to 75 microns; and
    compacting the dispensed tape onto the first ply, such that the polymer material width covers the width of the dispensed tape.

16. The computer program product of claim 15, further comprising instructions, that when executed by the processor, perform the steps of:
    continuously monitoring the polymer material width; and
    adjusting a process parameter to maintain a polymer material width.

* * * * *